Aug. 11, 1964   A. SCHMERMUND   3,144,063
CUTTING MACHINE
Filed Jan. 18, 1961   2 Sheets-Sheet 1

Inventor
Alfred Schmermund.
By Rommel, Allwine Rommel
Attorneys

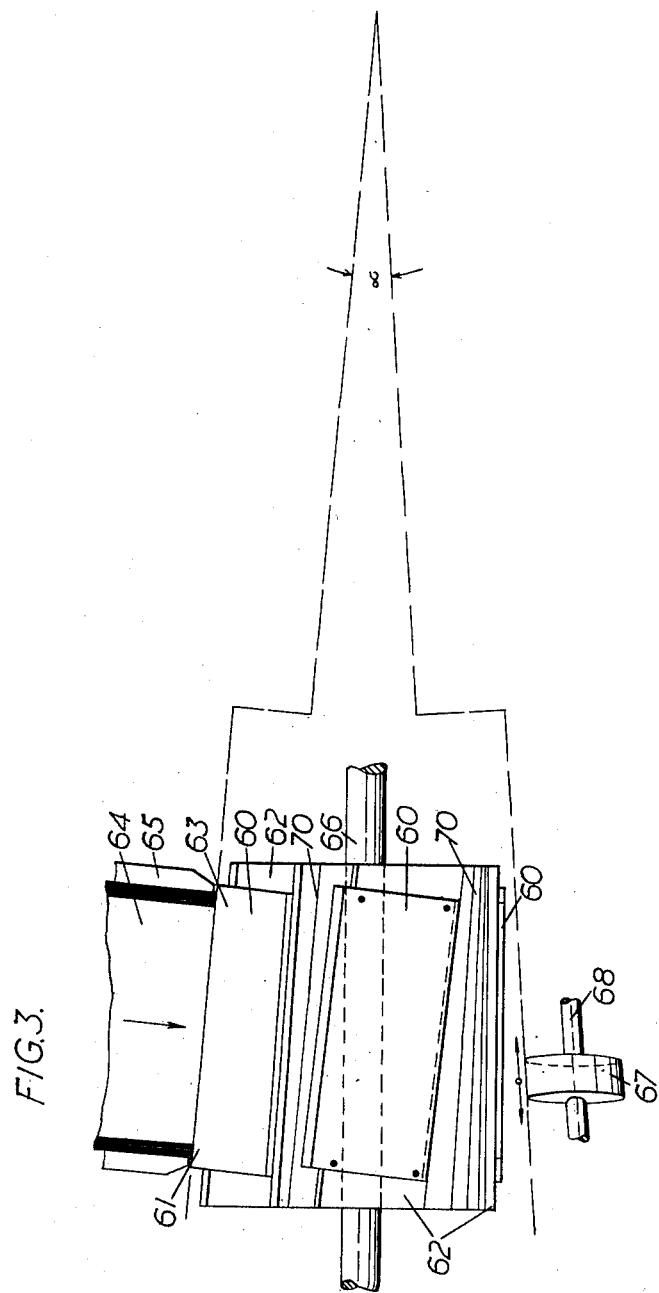

United States Patent Office 3,144,063
Patented Aug. 11, 1964

3,144,063
CUTTING MACHINE
Alfred Schmermund, 62 Kornerstrasse, Gevelsberg,
Westphalia, Germany
Filed Jan. 18, 1961, Ser. No. 83,572
5 Claims. (Cl. 146—117)

The invention relates to a cutting machine, for example for cutting tobacco or the like.

In the complete specification of my United Kingdom Patent No. 829,897 corresponding to my U.S. application 11,773, filed February 29, 1960, now abandoned, there has been disclosed a cutting machine comprising a rotatable drum-like frame on which a cutter having a straight cutting edge is mounted with the edge of the cutter lying on or parallel to a line connecting two points on the periphery of opposite ends of the frame, the point at one end being displaced around the periphery of the drum-like frame relatively to the point at the other end, whereby the straight cutting edge describes a hyperboloid of revolution on rotation of the frame.

It is an object of the present invention to provide an improvement in or modification of the cutting machine disclosed in said patent specification.

It is a more specific object of the invention to provide a cutting machine wherein cutting blades are so arranged that cutting of tobacco, tea or similar material is facilitated while the blades can be sharpened during operation of the machine.

These and other objects and advantages of the invention will become apparent from the following detailed description of an embodiment of the invention when read with reference to the attached schematical drawings, in which, FIGURE 1 is a side elevational view of the improved cutting machine.

FIGURE 3 is a plan view of the machine shown in FIGURE 1.

Figure 1:
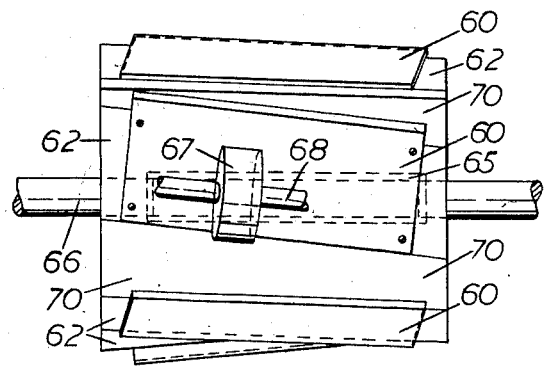
Figure 2:
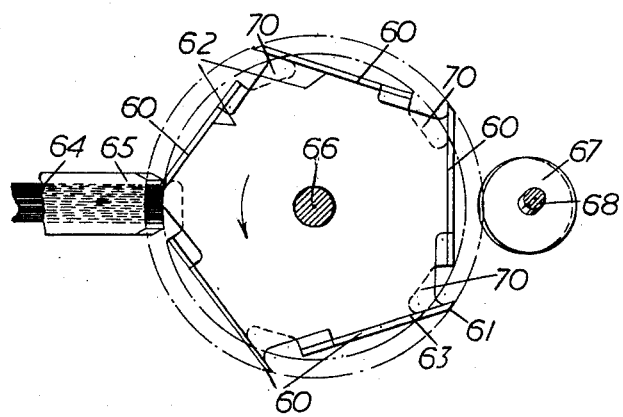
FIGURE 2 is a front end elevation of the machine of FIGURE 1.

The machine illustrated comprises five cutter blades 60 arranged on a carrier frame 62 in the shape of a right regular prism having five prism faces. Each cutter blade has a cutting edge. A recess 70 is provided in each prism face adjacent to the blade 60 mounted on said face. Each cutter blade is parallel to the respective prism face and is so inclined relatively to the prism axis that first one end 61 of the cutting edge and subsequently the opposite end 63 thereof performs the cut. The material to be cut, for example tobacco schematically indicated at 64, is fed through a nozzle 65 co-operating with the cutter blades 60.

The nozzle 65 has a cutting edge relative to which a driving shaft 66 for the carrier, whose axis coincides with that of the carrier 62, is inclined through an angle alpha 2, the angle alpha corresponding to the apex angle of the conical hyperboloid described by the cutting edges of the cutter blades on rotation.

Grinding of the cutting edges of the cutter blades 60 is effected by means of a grinding disc 67 on a shaft 68, the said grinding disc being displaceable in an inclined direction parallel to the straight cutting edges.

It should be clearly understood that the embodiment described is given by way of example only, and that modifications, omissions and additions are possible without departing from the spirit of the invention.

I claim:

1. A cutting machine comprising the combination of a support, a frame in the form of a right regular prism having a plurality of inclined faces, means mounting said frame in said support for rotation about the prism axis, and flat type cutter blades mounted on the faces of the prism parallel to the planes of said faces, each blade having an operating cutting edge which is straight and arranged obliquely to the prism axis whereby to scribe a conical hyperboloid of revolution during the rotation of the prism.

2. A cutting machine as described in claim 1, wherein a nozzle is provided for feeding materials to be cut onto the cutting edges of the blades, said nozzle being provided with a nozzle outlet shearing edge adjacently paralleling the border line of the conical hyperboloid through which the cutting edges pass during rotation of the prism.

3. A cutting machine as described in claim 2, wherein the axis of rotation of the frame is inclined relative to the front edge of the nozzle by one half of the apex angle of the conical hyperboloid.

4. A cutting machine as described in claim 1, wherein means is provided for sharpening the cutter blades, said means being movable along and parallel with the cutting edges of the blades.

5. A cutting machine comprising the combination of a support, a frame in the form of a right regular prism having a plurality of faces which are each inclined from one end of the prism to the other end thereof, means mounting said frame in said support for rotation about the prism axis, and cutter blades mounted directly on the faces of the prism parallel to the planes of said faces, each blade having a portion thereof with a cutting edge extending marginally beyond the respective face on which it is mounted.

References Cited in the file of this patent

UNITED STATES PATENTS

| | | |
|---|---|---|
| 34,533 | Taylor | Feb. 25, 1862 |
| 2,735,469 | West | Feb. 21, 1956 |
| 2,829,693 | Jarvis | Apr. 8, 1958 |
| 2,829,695 | Jarvis | Apr. 8, 1958 |
| 2,830,634 | Pollmann | Apr. 15, 1958 |
| 2,848,030 | Rudszinat | Aug. 19, 1958 |
| 2,863,481 | West | Dec. 9, 1958 |
| 2,868,253 | Kirk et al. | Jan. 13, 1959 |

FOREIGN PATENTS

| | | |
|---|---|---|
| 1,116,464 | Germany | Nov. 2, 1961 |